(12) United States Patent
Martin et al.

(10) Patent No.: US 12,373,869 B2
(45) Date of Patent: Jul. 29, 2025

(54) SYSTEMS AND METHODS FOR DYNAMIC TRANSACTIONS

(71) Applicant: Number1 Ventures LLC, Rolling Hills Estates, CA (US)

(72) Inventors: Andrew Thomas Martin, Solana Beach, CA (US); Christopher Andrew Fawcett, San Diego, CA (US)

(73) Assignee: Number1 Ventures LLC, Rolling Hills Estates, CA (US)

( * ) Notice: Subject to any disclaimer, the term of this patent is extended or adjusted under 35 U.S.C. 154(b) by 288 days.

(21) Appl. No.: 17/520,241

(22) Filed: Nov. 5, 2021

(65) Prior Publication Data

US 2023/0142582 A1 May 11, 2023

(51) Int. Cl.
*G06Q 30/00* (2023.01)
*G06F 3/04847* (2022.01)
*G06Q 20/20* (2012.01)
*G06Q 30/0601* (2023.01)

(52) U.S. Cl.
CPC ..... *G06Q 30/0611* (2013.01); *G06F 3/04847* (2013.01); *G06Q 20/20* (2013.01)

(58) Field of Classification Search
CPC . G06Q 30/0611; G06Q 20/20; G06F 3/04847
See application file for complete search history.

(56) References Cited

U.S. PATENT DOCUMENTS

| | | | |
|---|---|---|---|
| 8,170,937 B1 * | 5/2012 | Nathanson | G06Q 30/0275 705/35 |
| 2003/0023537 A1 * | 1/2003 | Joshi | G06Q 30/08 705/37 |
| 2013/0290145 A1 * | 10/2013 | Durst, Jr. | G06Q 30/0629 705/26.64 |
| 2019/0244280 A1 * | 8/2019 | Chong | G06F 8/38 |

* cited by examiner

*Primary Examiner* — Rokib Masud
(74) *Attorney, Agent, or Firm* — Procopio, Cory, Hargreaves & Savitch LLP

(57) ABSTRACT

A method comprising using at least one hardware processor to: receive a scan a code associated with an item; display on a user interface information related to the product, the list price of the product, and a mechanism to allow a user to make a counter offer; receive an offer via the mechanism that is less than the list price, but greater than a minimum negotiation price; display the offer via the user interface; communicate the offer to a proprietor; display via the user interface whether the offer was accepted, reject or countered.

21 Claims, 4 Drawing Sheets

SYSTEMS AND METHODS FOR DYNAMIC TRANSACTIONS

BACKGROUND

Field of the Invention

The embodiments described herein are generally directed to improve in store transactions, and more particularly, to dynamic, real-time transactions.

Description of the Related Art

In store transactions have always been the same. The proprietor puts a price tag on the items in the store, the consumer enters, browses and purchases items that they need/desire and for which they are comfortable with the price. But this age old approach is actually horribly inefficient. As a result, stores often need to put items on sale in order to clear inventory, generate sales volume and revenue. The issue of course, is that proprietors want to maximize each transaction, in terms of the amount a particular customer is willing to pay, but they have no advanced data to inform as to what a particular customer is willing to pay.

Proprietors may have a target margin for different types of products, historical data about price sensitivity for certain types of products, or other backward looking data that informs them as to what price to attached to each product. But again, proprietors lack any data that would allow them to determine, for each transaction an optimal price.

Another issue for proprietors is simply increasing the volume of transactions. If the list price is too high, then obviously the number of sales will be low. Without data on what individual customers are willing to pay, the proprietor is stuck trying to come up with list prices that result in a high level of transactions at an acceptable margin. Again, the can be an inefficient process.

SUMMARY

Accordingly, systems, methods, and non-transitory computer-readable media are disclosed to allow proprietors to maximize, or at least optimize each transaction.

In an embodiment, a method comprising using at least one hardware processor to: receive a scan a code associated with an item; display on a user interface information related to the product, the list price of the product, and a mechanism to allow a user to make a counter offer; receive an offer via the mechanism that is less than the list price, but greater than a minimum negotiation price; display the offer via the user interface; communicate the offer to a proprietor; display via the user interface whether the offer was accepted, reject or countered.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for improved in store transactions, and more particularly, to dynamic, real-time transactions.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Figure 1:
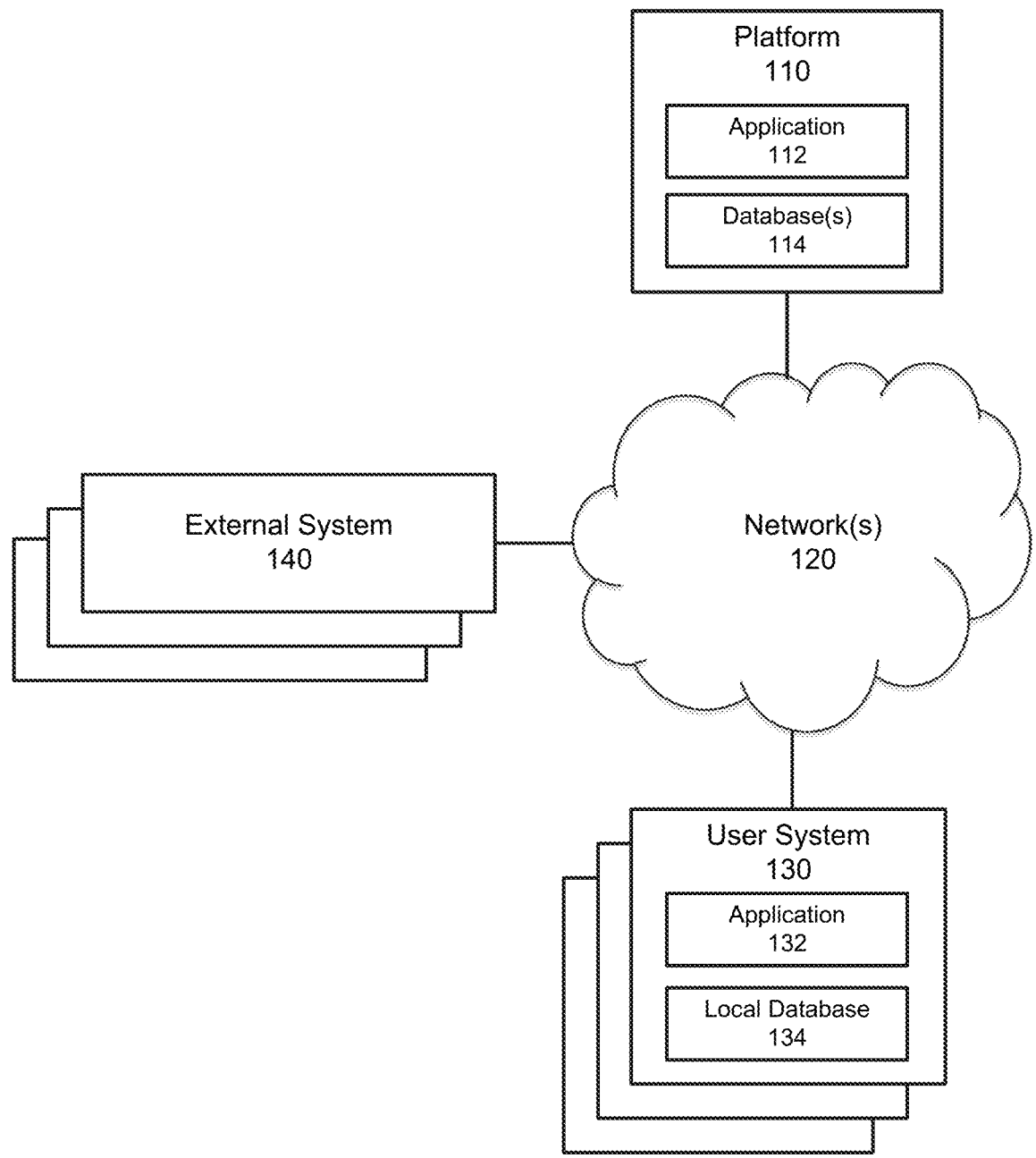
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions of the application described herein.

Figure 2:
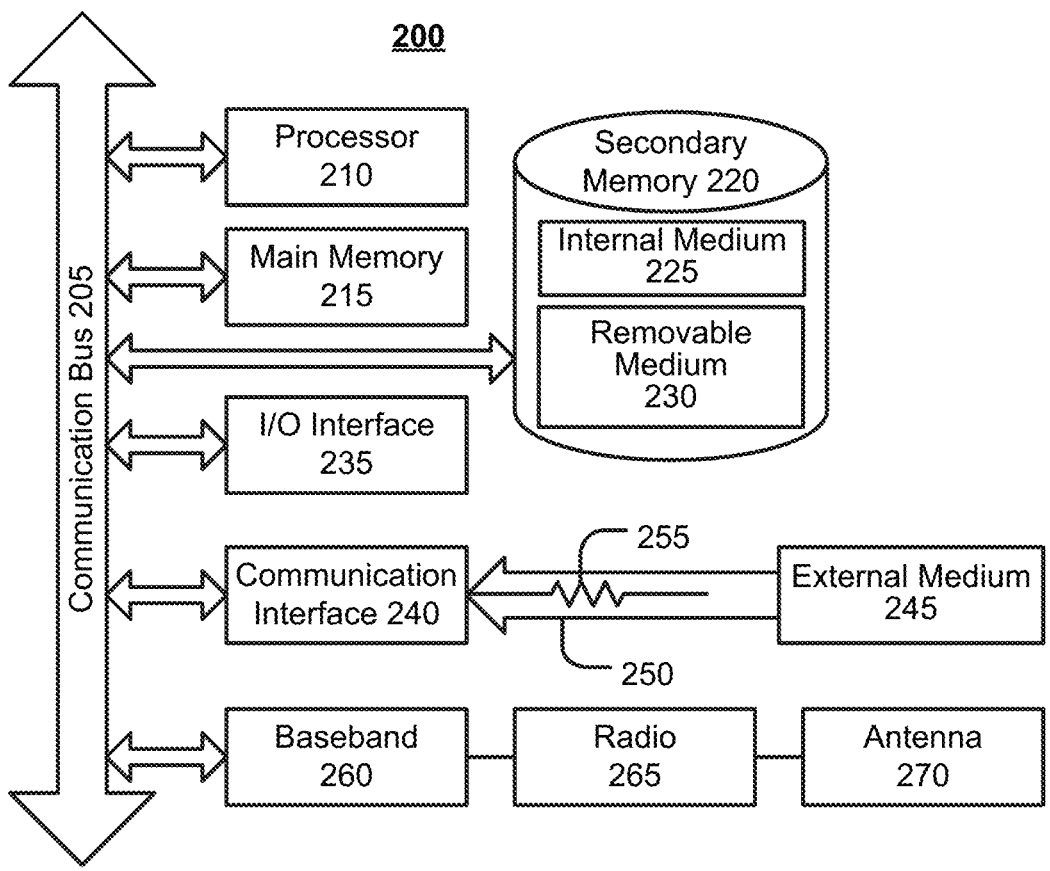
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

Embodiments of processes for dynamic, real-time transactions will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figure 3:
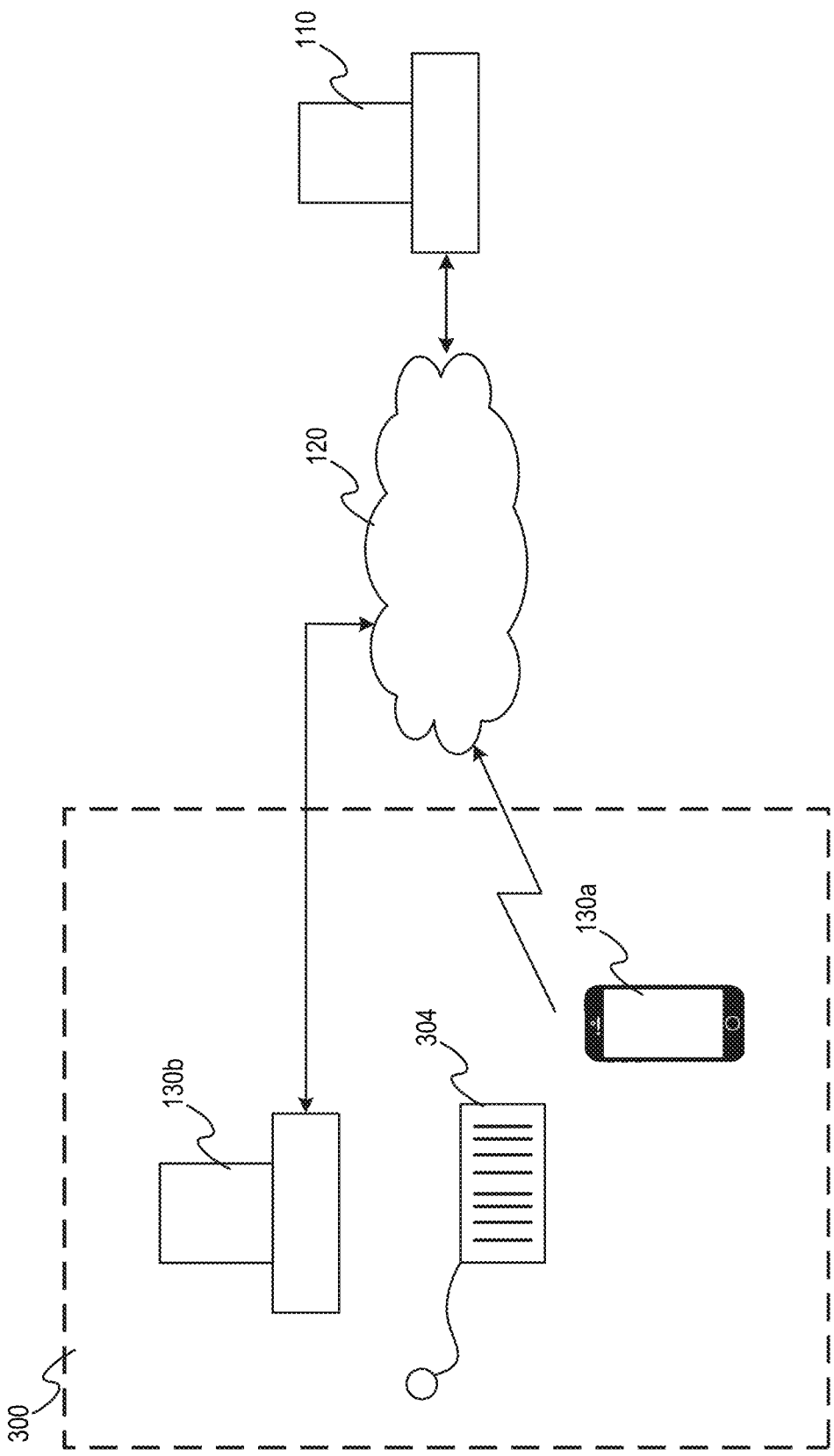
FIG. 3 illustrates an in-store environment for the systems, methods, and non-transitory computer-readable media for improved in store transactions, according to an embodiment.

The process will be described with respect to the system of FIG. 3, which can be implemented in the infrastructure of FIG. 1. The system of FIG. 3 illustrates an in-store environment 300. In this environment 300, the proprietor can establish a price for each item in the store and place a tag 304 on each item that comprises a code 305, e.g., bar code or QR code. A customer can then download an application (app) 132 to their user system 130, which may, e.g., be smart phone or tablet. The customer can then scan the code, using their user system 130. This will cause the app 132 to launch a user interface 402, such as that illustrated in FIG. 4, which can display information about the product and the list price. The consumer can them make a counter offer and can negotiate via the app 132.

The slider feature 404 of the user interface 402 enables the counter offer and negotiating capability. As illustrated, the slider 404 can be color coded. For example, on one end the slider can be colored red, and the colors can transition to green on the other side. The green can correspond to the listed price on the tag 304. The red can correspond to a negotiable price depending on the configuration as described below.

For example, if the list price is $100 and the floor or minimum price that the proprietor is willing to take is $55, then the red portion of the slider feature 404 can start at a percentage of the floor, e.g., 75% or $41. But the proprietor can also be given the option to set other negotiable settings. For example, if the price is really not negotiable, then the proprietor can select that the red negotiable portion start at 100% of the floor or $55 in this example. Conversely, the proprietor can select that the negotiable portion start at 0% of the floor or $0. These can represent standard, hardline and "desperate" settings. Of course, other percentages can be used, more settings can be implemented, and/or the proprietor can be allowed to just set a percentage.

In certain embodiments, the platform/app. can be configured to recommend settings such as price, floor, negotiation percentage, etc., based on the customer's behavior, information related to the item, such as the transaction histories for same or similar items or categories of items, time of day, day of the week, location, etc.

Figure 4:
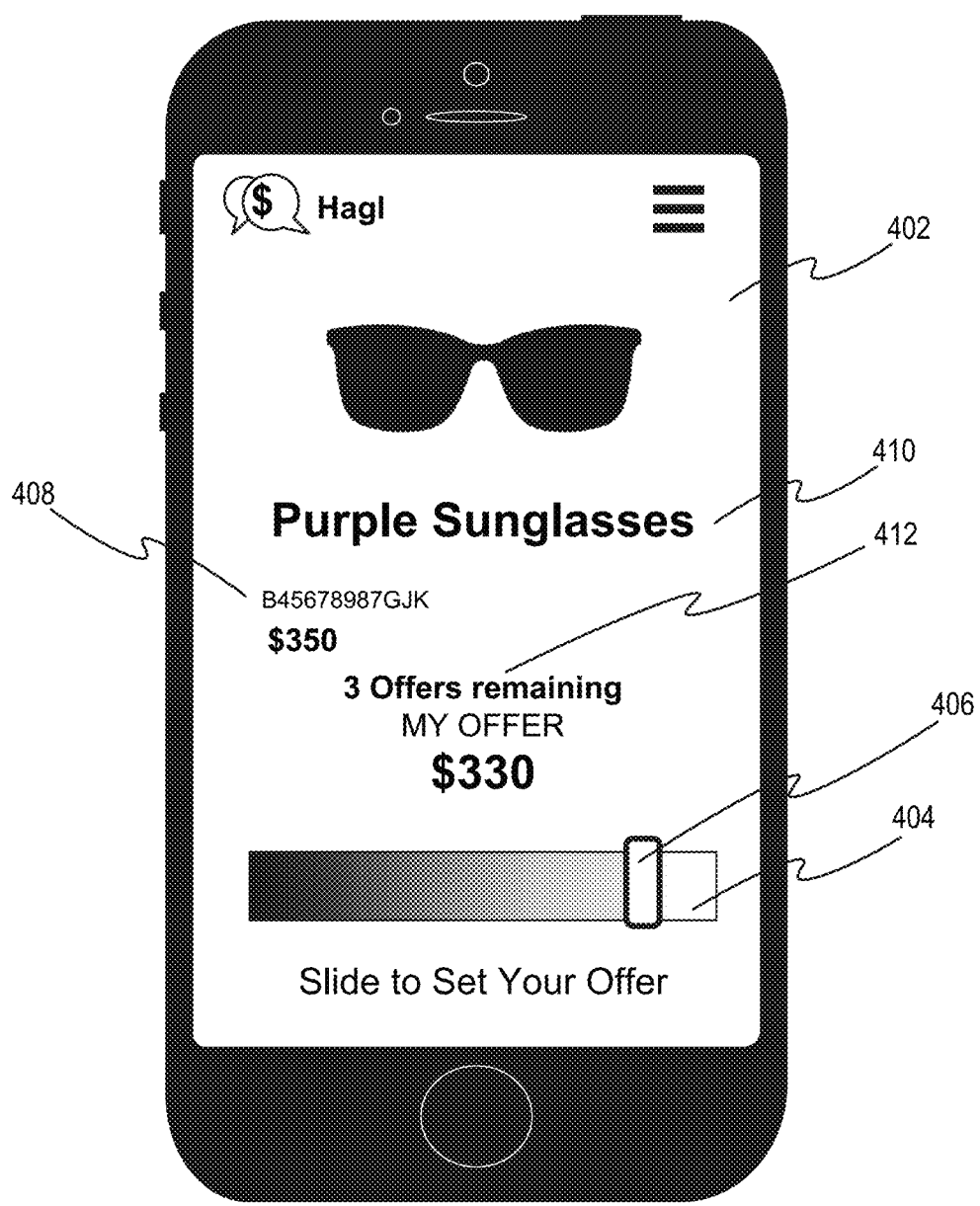
FIG. 4 illustrates a user interface used to implement the systems, methods, and non-transitory computer-readable media are disclosed for improved in store transactions, according to an embodiment.

Thus, as illustrated in FIG. 4, when the customer scans the code on the tag 304, the user interface 402 can be configured to display a description 410 of the product as well as the listed price 408. The slider feature 404 can also be displayed with a slider 406 that can be manipulated by the user, e.g., by sliding a finger on the display to move the slider 406. As the consumer slides the slider 406, the corresponding offer value 412 can be displayed.

Once the consumer's offer is set, it is communicated to the proprietor. The proprietor can have an app or a portal that they can access to receive and respond to offers. In certain embodiments the proprietor can simply reject or accept the offer. But the proprietor can also have the ability to counter offer. The counter can be manual, or automated, e.g., if the proprietor elects to counter, the counter can automatically be set at a certain amount, such as halfway between the floor and the list price or the offer and the list price, whichever is higher.

A counter can then be displayed via the user interface 402, e.g., as an update to the price 408. This can, in certain embodiments, also reset the values associated with the slider feature 404. The consumer can also counter the proprietor's counter offer. In certain embodiments, the consumer can be limited to, e.g., 3 counter offers. Moreover, the system can be configured such that each consumer counter must be higher than the previous offer.

Moreover, each offer can be binding. For example, the consumer may need to provide payment information, e.g., a credit card or bank account, which is loaded into the application and/or stored in platform 110. Thus, of the consumer's offer is accepted, then the transaction is processed. In general, when an offer is accepted, the user interface can be configured to indicate such. If the transaction is not automatically processed, then the customer can be instructed via the user interface to provide payment through the app, or to go to a point-of-sale to conclude the transaction.

It should also be noted that the offers and counteroffers can be routed through platform 110, which can also act as the transaction manager, or the offers can be communicated directly between the user system 130a of the consumer and the user system 130b of the proprietor. In summary, the platform and app. present a technical system that allows the overall margin for a proprietor to be optimized, e.g., as an alternative to a proprietor putting something on sale or clearance for a fixed lower price. The platform/app. also provide an engaging experience that also benefits the consumer and increases the chance of a transaction actually occurring within the proprietor's preference for how negotiable they want to be.

In certain embodiments, the system can recommend counter offers to the customer and or proprietor that optimize the chances of the transaction occurring based on the customer's behavior, information related to the item, such as the transaction histories for same or similar items or categories of items, time of day, day of the week, location, etc.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   scan a code on an item in a store;
   receive the code associated with the item;
   display on a user interface information related to the product, the list price of the product, and a mechanism to allow a user to make a counter offer;
   receive an offer via the mechanism that is less than the list price, but greater than a minimum negotiation price, wherein the mechanism is a slider feature displayed on the user interface, and wherein receiving the offer comprises detecting that a slider on the slider mechanism has been moved and correlating the position of the slider to a price based on the location of the slider, and wherein one end of the slider feature corresponds to a list price and the other to the minimum negotiation price;
   display the offer via the user interface;
   communicate the offer to a proprietor; and
   display via the user interface whether the offer was accepted, rejected or countered.

2. The method of claim 1, further comprising, when the offer is accepted, indicating such via the user interface and accessing payment information to automatically complete the transaction.

3. The method of claim 1, further comprising, when the offer is accepted, indicating such via the user interface, requesting payment information, receiving the payment information and processing the payment information in order to complete the transaction.

4. The method of claim 1, further comprising, when the offer is accepted, indicating such via the user interface and instructing the user to go to a point-of-sale to complete the transaction.

5. The method of claim 1, further comprising receiving the list price, minimum negotiation price, and floor price for the item.

6. The method of claim 1, further comprising receiving a counter offer and displaying the counter offer via the user interface.

7. The method of claim 1, further comprising receiving a selection associated with the minimum negotiable price.

8. A system comprising:
  at least one hardware processor; and
  one or more software modules that are configured to, when executed by the at least one hardware processor,
  scan a code on an item in a store;
  receive the code associated with the item;
  display on a user interface information related to the product, the list price of the product, and a mechanism to allow a user to make a counter offer;
  receive an offer via the mechanism that is less than the list price, but greater than a minimum negotiation price, wherein the mechanism is a slider feature displayed on the user interface, and wherein receiving the offer comprises detecting that a slider on the slider mechanism has been moved and correlating the position of the slider to a price based on the location of the slider, and wherein one end of the slider feature corresponds to a list price and the other to the minimum negotiation price;
  display the offer via the user interface;
  communicate the offer to a proprietor; and
  display via the user interface whether the offer was accepted, rejected or countered.

9. The system of claim 8, one or more software modules that are configured to, when the offer is accepted and when executed by the at least one hardware processor indicate such via the user interface and accessing payment information to automatically complete the transaction.

10. The system of claim 8, one or more software modules that are configured to, when the offer is accepted and when executed by the at least one hardware processor indicate such via the user interface, requesting payment information, receiving the payment information and processing the payment information in order to complete the transaction.

11. The system of claim 8, one or more software modules that are configured to, when the offer is accepted and when executed by the at least one hardware processor indicate such via the user interface and instructing the user to go to a point-of-sale to complete the transaction.

12. The system of claim 8, one or more software modules that are configured to, when executed by the at least one hardware processor receive the list price, minimum negotiation price, and floor price for the item.

13. The system of claim 8, one or more software modules that are configured to, when executed by the at least one hardware processor receive a counter offer and displaying the counter offer via the user interface.

14. The system of claim 8, one or more software modules that are configured to, when executed by the at least one hardware processor receive a selection associated with the minimum negotiable price.

15. A non-transitory computer-readable medium having instructions stored therein, wherein the instructions, when executed by a processor, cause the processor to:
  scan a code on an item in a store;
  receive the code associated with the item;
  display on a user interface information related to the product, the list price of the product, and a mechanism to allow a user to make a counter offer;
  receive an offer via the mechanism that is less than the list price, but greater than a minimum negotiation price, wherein the mechanism is a slider feature displayed on the user interface, and wherein receiving the offer comprises detecting that a slider on the slider mechanism has been moved and correlating the position of the slider to a price based on the location of the slider, and wherein one end of the slider feature corresponds to a list price and the other to the minimum negotiation price;
  display the offer via the user interface;
  communicate the offer to a proprietor; and
  display via the user interface whether the offer was accepted, reject rejected or countered.

16. The non-transitory computer-readable medium of claim 15, wherein the instructions, when executed by a processor, further cause the processor, when the offer is accepted, to indicating such via the user interface and accessing payment information to automatically complete the transaction.

17. The non-transitory computer-readable medium of claim 15, wherein the instructions, when executed by a processor, further cause the processor, when the offer is accepted, to indicate such via the user interface, requesting payment information, receiving the payment information and processing the payment information in order to complete the transaction.

18. The non-transitory computer-readable medium of claim 15, wherein the instructions, when executed by a processor, further cause the processor, when the offer is accepted, to indicate such via the user interface and instructing the user to go to a point-of-sale to complete the transaction.

19. The non-transitory computer-readable medium of claim 15, wherein the instructions, when executed by a processor, further cause the processor to receive the list price, minimum negotiation price, and floor price for the item.

20. The non-transitory computer-readable medium of claim 15, wherein the instructions, when executed by a processor, further cause the processor to receive a counter offer and displaying the counter offer via the user interface.

21. The non-transitory computer-readable medium of claim 15, wherein the instructions, when executed by a processor, further cause the processor to receive a selection associated with the minimum negotiable price.

* * * * *